US008024579B2

(12) United States Patent
Challener et al.

(10) Patent No.: US 8,024,579 B2
(45) Date of Patent: Sep. 20, 2011

(54) AUTHENTICATING SUSPECT DATA USING KEY TABLES

(75) Inventors: David Carroll Challener, Raleigh, NC (US); John H. Nicholson, Durham, NC (US); Joseph Michael Pennisi, Apex, NC (US); Rod D. Waltermann, Rougemont, NC (US)

(73) Assignee: Lenovo (Singapore) PTE Ltd., Singapore (SG)

( * ) Notice: Subject to any disclaimer, the term of this patent is extended or adjusted under 35 U.S.C. 154(b) by 1153 days.

(21) Appl. No.: 11/647,932

(22) Filed: Dec. 29, 2006

(65) Prior Publication Data

US 2008/0162932 A1 Jul. 3, 2008

(51) Int. Cl.
*G06F 11/30* (2006.01)

(52) U.S. Cl. ........ 713/187; 713/168; 713/170; 713/189; 713/193; 726/2; 726/5

(58) Field of Classification Search .................. None
See application file for complete search history.

(56) References Cited

U.S. PATENT DOCUMENTS

| | | | | |
|---|---|---|---|---|
| 5,995,623 | A * | 11/1999 | Kawano et al. | 713/189 |
| 7,191,335 | B1 * | 3/2007 | Maillard | 713/176 |
| 7,624,272 | B2 * | 11/2009 | Wiseman et al. | 713/176 |
| 2002/0129261 | A1* | 9/2002 | Cromer et al. | 713/193 |
| 2004/0005051 | A1* | 1/2004 | Wheeler et al. | 380/28 |
| 2005/0138393 | A1 | 6/2005 | Challener | 713/186 |
| 2005/0149733 | A1 | 7/2005 | Catherman et al. | |
| 2006/0005015 | A1 | 1/2006 | Durham et al. | |
| 2007/0016766 | A1* | 1/2007 | Richmond et al. | 713/100 |
| 2007/0226518 | A1* | 9/2007 | Yasaki et al. | 713/189 |

FOREIGN PATENT DOCUMENTS

WO 2006/011943 2/2006
WO 2006/124751 11/2006

OTHER PUBLICATIONS

Trusted computing group, trusted platform modules strengthen user and platform authenticity, Jan. 2005.
Trusted Computing Group, Trusted Platform Modules Strengthen User and Platform Authenticity, Jan 2005, downloaded Mar. 18, 2008 from: https://www.trustedcomputinggroup.org/specs/TPM/ Whitepaper_TPMs_Strengthen_User_and_Platform_Authenticity_Final_1_0.pdf.

* cited by examiner

Primary Examiner — Taghi T Arani
Assistant Examiner — Amir Mehrmanesh
(74) Attorney, Agent, or Firm — Buchenhorner Patent Law

(57) ABSTRACT

A system and method for authenticating suspect code includes steps of: receiving the suspect code for a first instance of a trusted platform module; loading the suspect code into a trusted platform module device operatively associated with a processor, wherein the suspect code is loaded outside of a shielded location within the trusted platform module device; retrieving a validation public key from a table and storing it in a register in the trusted platform module device, the validation public key indexed by the suspect code; and retrieving a hash algorithm from the table, the hash algorithm indexed by the suspect code. The hash algorithm is run to derive a first hash value; then, using the validation public key, the second hash value is decrypted to derive a second decrypted hash value. The two hash values are compared; and upon determining a match, the suspect code is loaded into the shielded location of the processor for execution by the processor.

6 Claims, 10 Drawing Sheets

332

| TPM | Public Key | Hash Algorithm | Hash Value |
|---|---|---|---|
| $TPM_1$ | PK1 | Alg1 | Hash1 |
| $TPM_2$ | PK2 | Alg2 | Hash2 |
| $TPM_3$ | PK3 | Alg4 | Hash3 |
| $TPM_4$ | PK4 | Alg2 | Hash4 |
| $TPM_5$ | PK5 | Alg5 | Hash5 |
| $TPM_6$ | PK6 | Alg3 | Hash6 |
| $TPM_n$ | PKn | Algn | Hashn |

| TPM | Endorsement Key for TPM | |
|---|---|---|
| TPM$_1$ | EK1 | EK$pr$1 |
| | | EK$pu$1 |
| TPM$_2$ | EK2 | EK$pr$2 |
| | | EK$pu$2 |
| TPM$_3$ | EK3 | EK$pr$3 |
| | | EK$pu$3 |
| TPM$_4$ | EK4 | EK$pr$4 |
| | | EK$pu$4 |
| TPM$_5$ | EK5 | EK$pr$5 |
| | | EK$pu$5 |
| TPM$_6$ | EK6 | EK$pr$6 |
| | | EK$pu$6 |
| TPM$_n$ | EKn | EK$pr$n |
| | | EK$pu$n |

| TPM | Public key | Hash info | | Endorsement Key for TPM | |
|---|---|---|---|---|---|
| $TPM_1$ | PK1 | Alg1 | EK1 | EK$pr$1 | |
| | | Hash1 | | EK$pu$1 | |
| $TPM_2$ | PK2 | Alg2 | EK2 | EK$pr$2 | |
| | | Hash2 | | EK$pu$2 | |
| $TPM_3$ | PK3 | Alg3 | EK3 | EK$pr$3 | |
| | | Hash3 | | EK$pu$3 | |
| $TPM_4$ | PK4 | Alg4 | EK4 | EK$pr$4 | |
| | | Hash4 | | EK$pu$4 | |
| $TPM_5$ | PK5 | Alg5 | EK5 | EK$pr$5 | |
| | | Hash5 | | EK$pu$5 | |
| $TPM_6$ | PK6 | Alg6 | EK6 | EK$pr$6 | |
| | | Hash6 | | EK$pu$6 | |
| $TPM_n$ | PKn | Algn | EKn | EK$pr$n | |
| | | Hashn | | EK$pu$n | |

*FIG. 8*

| 362 | | | | | |
|---|---|---|---|---|---|
| TPM | Emulator Code 314 | Public key | Hash info | Endorsement Key for TPM | |
| $TPM_1$ | Firmware1 | PK1 | Alg1 | EK1 | $EKpr1$ |
| | | | Hash1 | | $EKpu1$ |
| $TPM_2$ | Firmware2 | PK2 | Alg2 | EK2 | $EKpr2$ |
| | | | Hash2 | | $EKpu2$ |
| $TPM_3$ | Firmware3 | PK3 | Alg3 | EK3 | $EKpr3$ |
| | | | Hash3 | | $EKpu3$ |
| $TPM_4$ | Firmware4 | PK4 | Alg4 | EK4 | $EKpr4$ |
| | | | Hash4 | | $EKpu4$ |
| $TPM_5$ | Firmware5 | PK5 | Alg5 | EK5 | $EKpr5$ |
| | | | Hash5 | | $EKpu5$ |
| $TPM_6$ | Firmware6 | PK6 | Alg6 | EK6 | $EKpr6$ |
| | | | Hash6 | | $EKpu6$ |
| $TPM_n$ | Firmwaren | PKn | Algn | EKn | $EKprn$ |
| | | | Hashn | | $EKpun$ |

*FIG. 10*

AUTHENTICATING SUSPECT DATA USING KEY TABLES

CROSS-REFERENCE TO RELATED APPLICATIONS

Not applicable.

STATEMENT REGARDING FEDERALLY SPONSORED-RESEARCH OR DEVELOPMENT

Not applicable.

INCORPORATION BY REFERENCE OF MATERIAL SUBMITTED ON A COMPACT DISC

Not Applicable.

FIELD OF THE INVENTION

The invention disclosed broadly relates to the field of data security, and more particularly relates to the field of enhancing the security features of trusted platform modules.

BACKGROUND OF THE INVENTION

E-commerce, e-government and e-business are all growing in tandem with an increase in cyber crime. Many high tech security technologies have been implemented to address the increasing threat of cyber crime, but there is a tradeoff emerging in the use of security technologies for protecting data and authenticating identities and transactions. IT owners of processes involving these identities and transactions desire to use specific authentication and encryption algorithms tailored to their risk profiles. Associated with these algorithms, they want to use specific, feature set implementations of Trusted Platform Modules (TPMs) to support the required assurance level of their end to end systems and operational models. TPMs are microchips designed to provide certain basic security-related functions to the software that utilizes the TPM. As a hardware-based security system, a TPM is much safer than a software-based security feature, but this increased safety comes at a high price and usually more administrative work. FIG. 1 shows a simplified block diagram of a basic TPM 100. The hardware components of the TPM 100 include: a hardware engine 120, a hash engine 140, a random number generator 160, and internal hardware-protected storage 180. Currently, TPMs require specific cryptographic algorithms, such as RSA SHA-1 and HMAC (hash function based message authentication code). RSA was developed by R. L. Rivest, A. Shamir, and L. M. Adleman. SHA-1 is a secure hash algorithm standard.

Referring to FIG. 2 there is shown a TPM software stack. At the lowest level is the TPM hardware device 210, which is a chip usually located on a motherboard. The TPM is accessed via a TPM device driver library 220. Applications use the TPM through standard interfaces, or by directly implementing communication with the TSS 230. The TSS 230 is the TCPA (Trusted Computing Platform Alliance) Software Stack which provides the supporting functionality to the TPM. The next higher level is the cryptographic service provider 240, such as Microsoft's® CAPI. At the highest level are the applications 250 that use the TPM 210.

The typical approach of implementing various algorithms and TPMs as delivered in unique or integrated hardware devices will keep security costs rising. What is needed is a flexible, yet secure, approach that uses a secure programmable microcontroller to support various selectable authentication and encryption algorithms and to also use these with the emulation of different instances of TPM hardware. When execution code in a programmable microcontroller is loaded and unloaded from a cache for various operations the integrity of a particular security operation cannot be validated each time it is used. Bulk encryption (or block encryption) is on answer to this problem, but it is considered too slow.

Therefore, there is a need for a security system to overcome the shortcomings of the prior art.

SUMMARY OF THE INVENTION

Briefly, according to an embodiment of the invention a method for authenticating suspect code includes steps or acts of: receiving the suspect code for a first instance of a trusted platform module; loading the suspect code into a trusted platform module device operatively associated with a processor, wherein the suspect code is loaded outside of a shielded location within the trusted platform module device; retrieving a validation public key from a first table and storing it in a register in the trusted platform module device, the validation public key indexed by the suspect code; and retrieving a hash algorithm from a table, the hash algorithm indexed by the suspect code. The method further proceeds by: running the hash algorithm associated with the suspect code to derive a first hash value; decrypting, using the validation public key, an encrypted second hash value stored in the table to derive a second decrypted hash value, the second hash value indexed by the suspect code; comparing the second decrypted hash value to the first hash value to determine if they are equal; and upon determining that the first and second hash values are equal, loading the suspect code into the shielded location of the processor for execution by the processor.

The method further includes steps or acts of: retrieving an endorsement private key; storing the endorsement private key in a register within the trusted platform module device; and executing the suspect code from the execution space A system for validation of code, according to an embodiment of the present invention, includes the following components for carrying out the above method steps: a processor including an execution space; a trusted platform module device that includes trusted platform module registers; an endorsement key pair for each instance of trusted platform modules, the endorsement key including an endorsement private key and an endorsement public key; validation public keys and encrypted hash values for the each instance of trusted platform modules; a secure storage area including at least one table for storing validation software. The system further includes: an input/output interface, a system memory, and a mass storage device.

According to another embodiment of the present invention a computer readable medium includes software for executing the above method steps.

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 5 is a simplified diagram of a table of keys according to an embodiment of the present invention.

FIG. 6 is simplified diagram of another table of keys, according to an embodiment of the present invention.

FIG. 8 is a simplified block diagram of a table of keys showing both the endorsement keys and the validation public key in one table, according to another embodiment of the present invention.

FIG. 10 is a simplified diagram of a table of keys with the emulator code, the validation public key and the endorsement keys together in one table, according to another embodiment of the present invention.

Figure 1:
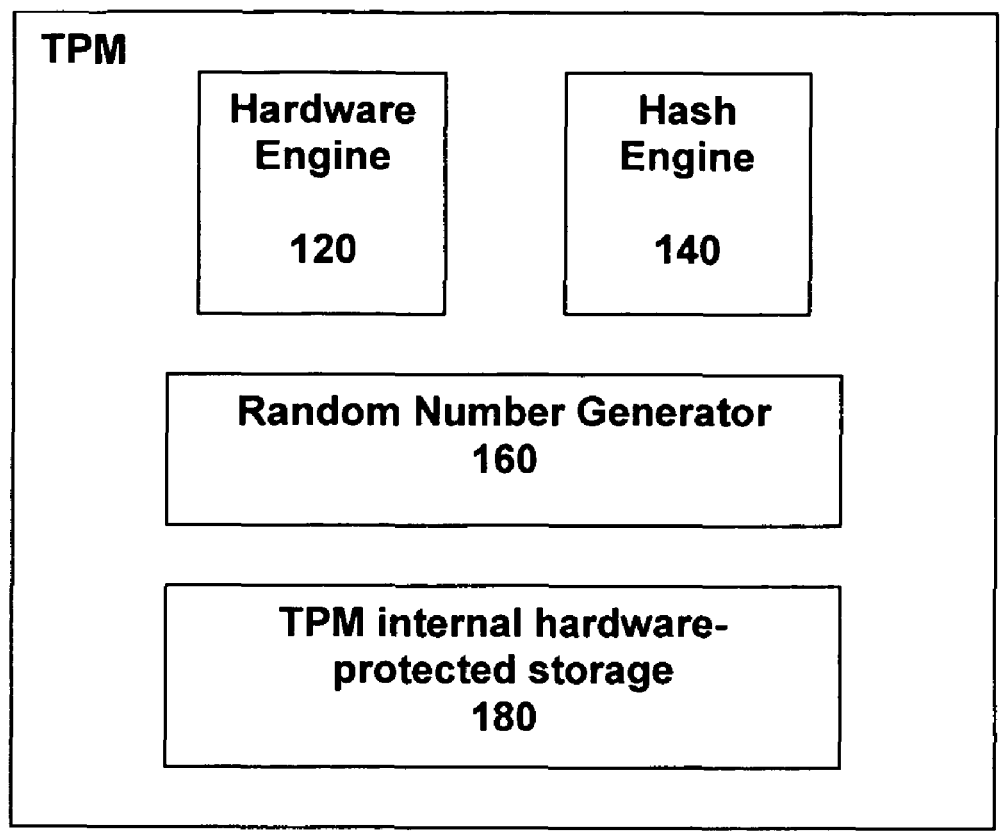
FIG. 1 is a simplified block diagram of a typical trusted platform module, according to the known art.
Figure 2:
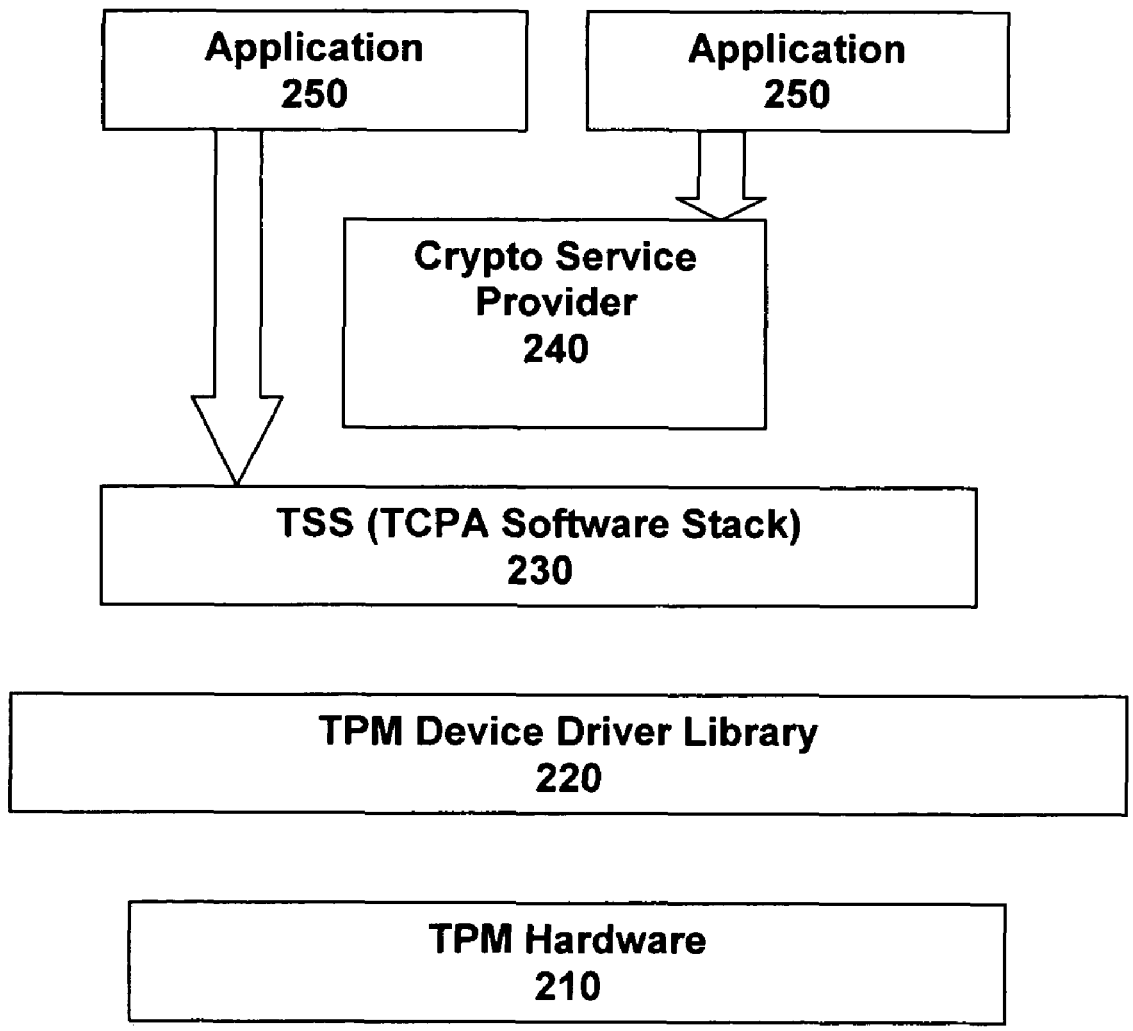
FIG. 2 is a simplified block diagram of a trusted platform module software stack, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a flexible but secure method for using a programmable microcontroller to support various selectable authentication and encryption algorithms and to also use these with the emulation of different instances of TPM hardware. This is accomplished by the novel use of tables of keys, indexed by the emulation code.

What follows is a Glossary of Terms (from "TCG Glossary of Technical Terms," incorporated by reference as if fully set forth herein) which are applicable to any discussion regarding TPMs:

Glossary of Terms:

Endorsement Key—EK; an RSA Key pair composed of a public key (EKpu) and private (EKpr). The EK is used to recognize a genuine TPM. The EK is used to decrypt information sent to a TPM in the Privacy CA and DAA protocols, and during the installation of an Owner in the TPM.

Endorsement Key Credential—A credential containing the EKpu that asserts that the holder of the EKpr is a TPM conforming to TCG specifications. Most TPMs are implemented in hardware, but this is not mandatory.

Non-volatile (shielded location)—A shielded storage location whose contents are guaranteed to persist between uses by Protected Capabilities.

Platform—A platform is a collection of resources that provides a service.

Protected Capabilities—The set of commands with exclusive permission to access shielded locations.

Root of Trust (component)—A component that must always behave in the expected manner, because its misbehavior cannot be detected. The complete set of Roots of Trust is at least the minimum set of functions to enable a description of the platform characteristics that affect the trustworthiness of the platform.

RSA—a cryptographic algorithm bearing the surname initials of its developers, R. L. Rivest, A. Shamir, and L. M. Adleman.

RTS—"Root of Trust for Storage"—a computing engine capable of maintaining an accurate summary of values of integrity digests and the sequence of digests.

RTR—"Root of Trust for Reporting"—a computing engine capable of reliably reporting information held by the RTS.

SHA-1—a secure hash algorithm standard.

Shielded Location—A place (memory, register, etc.) where it is safe to operate on sensitive data; data locations that can be accessed only by "protected capabilities."

Trust is the expectation that a device will behave in a particular manner for a specific purpose.

A Trusted Computing Platform is a computing platform that can be trusted to report its properties TPM—Trusted Platform Module—an implementation of the functions defined in the TCG Trusted Platform Module Specification; the set of Roots of Trust with shielded locations and protected capabilities; normally includes just the RTS and the RTR.

TSS—Trusted Software Stack—software services that facilitate the use of the TPM but do not require the protections afforded to the TPM.

The System.

Figure 3:
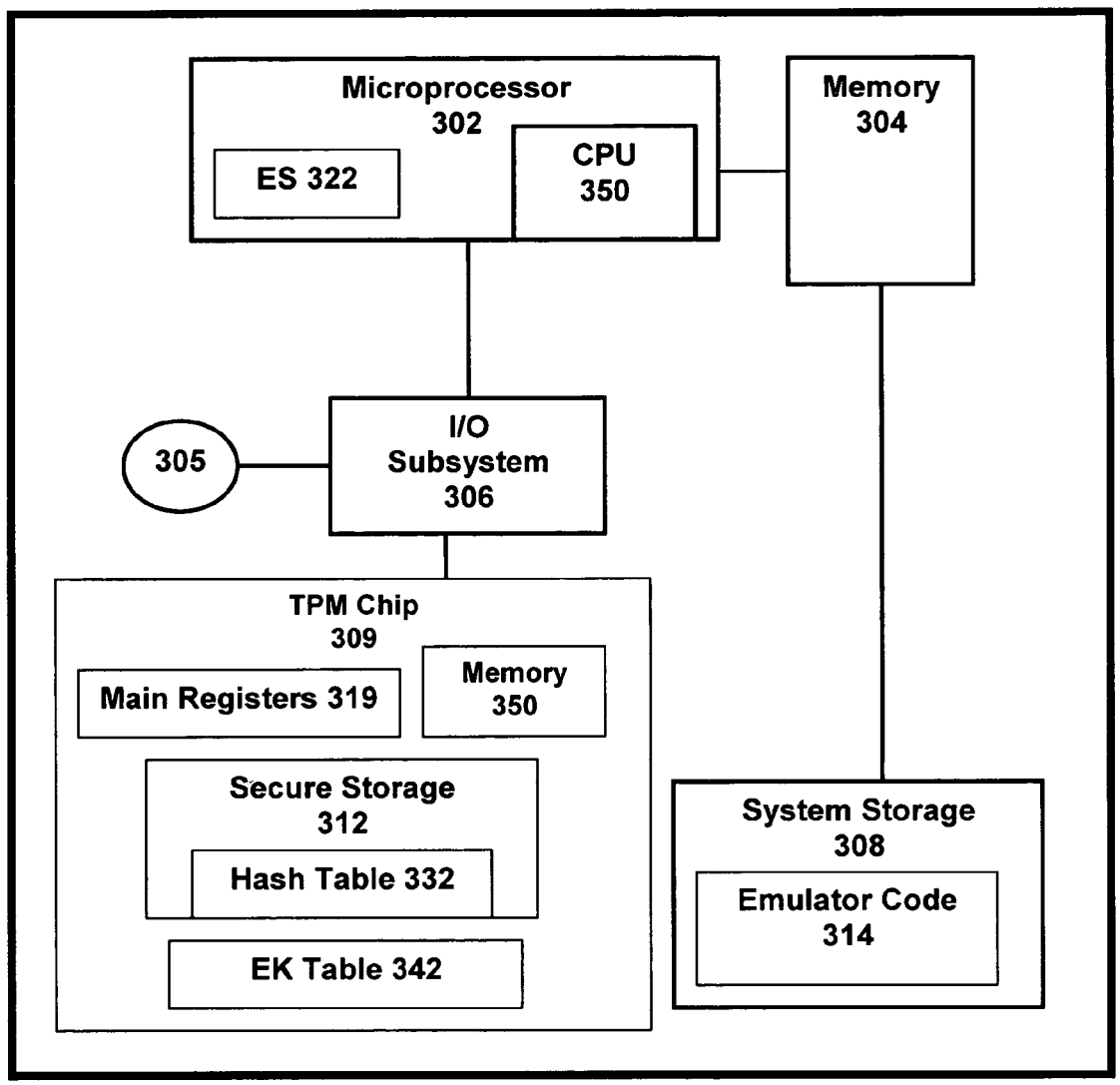
FIG. 3 is a high level block diagram of an information processing system configured to operate according to an embodiment of the invention.

Referring now in specific detail to the drawings, and particularly FIG. 3, there is illustrated a simplified block diagram of an information processing system 300 configured to operated according to an embodiment of the invention.

Referring to FIG. 3, information handling system 300 includes: a processor 302, a TPM chip 309, a system memory 304, and an input/output (I/O) subsystem 306. A storage medium such as a CDROM 305 is operatively connected to the I/O subsystem 306. Processor 302 and system memory 304 components can be physically connected or operatively interconnected. The TPM chip 309 may be located separately from the processor 302, or it may part of the processor 302, comprising a core chipset. The processor 302 can be a microprocessor. The processor 302 includes a microprocessor CPU 350 and an execution space 322. The execution space 322 is a secure area where data is protected against interference and prying, independent of its form. It is considered a shielded location. Only verified code is loaded into the execution space 322.

Secure memory 312 generally resides within the TPM chip 309. The secure memory 312 also contains embedded instructions in the form of microcode. System storage 308 is also available, outside of the shielded location. TPM emulator code 314 can be stored within the microprocessor 302 or in system storage 308 as depicted in FIG. 3.

The TPM chip 309 according to an embodiment of the present invention is a generic TPM chip that can emulate different TPMs using the TPM emulator code 314. The emulator code 314 enables the microprocessor 302 to simulate any trusted platform module, thus allowing a relatively inexpensive generic TPM chip to work with a broad range of platforms. This is important because TPMs can differ from organization to organization and there are many different formats available. For example, the United States government uses one type of TPM, and the Chinese government uses another type. TPM emulator code is known in the industry. The challenge becomes safeguarding the emulator code 314 so that no untrusted code is ever executed. This process will be explained in the discussion regarding FIG. 4 below.

Referring again to FIG. 3, a table 332 of hash values is stored within the secure storage area 312 and acts as a lookup table. This secure storage area 312 is generally located in the TPM chip 309 as shown in FIG. 3; however, it could be stored elsewhere, perhaps in the processor 302. The values in table 332 are indexed by the TPM code 314, as shown in FIG. 5. Additionally, another table 342 holds all of the endorsement keys generated for each TPM. A second table, table 342, is also shown stored within the TPM chip 309, but to conserve space it can be stored outside of the secure area 312, as shown in FIG. 3. Note that the two tables, 332 and 342, are illustrated in FIG. 3. This is merely to illustrate one embodiment; however, the actual configuration and number of tables could vary, depending on the information stored, the hardware configuration, and the individual system space constraints, according to the present invention.

At either manufacturing or install time, a hash value for each instance of execution code for a TPM is created. Usually this is done by the information technology (IT) owner. For each platform, there is a known list of supported TPMs. Each of the supported TPMs will have its own associated hash value. Each hash value (Hash) is bound with the endorsement key (EK) for that particular TPM. An endorsement key is a cryptographic key pair using the RSA algorithm. In addition to this key pair, a public key is also generated that holds the signature with which the TPM emulation code was signed. This public key, the validation public key (PK) is stored in table 332. Only the hash table 332 needs to be stored in secure storage, to conserve space. Concurrently, a hash value is also created for each of the encryption algorithms for the TPMs. The actual TPM emulator code 314 and encryption algorithm code and the encryption code's corresponding public key can be stored unencrypted in system storage 308 to conserve space within the microprocessor 302. The private key of the EK (EKpr), however, cannot be stored in system storage 308.

Referring now to FIG. 5, table 332 also stores the signed hash values (Hash) bound with the EK, and the validation public keys (PK). Table 332 additionally stores the hash algorithm (Alg) for each TPM code. All of these values are indexed by the TPM code. More specifically, in this embodiment, the first column of table 332 holds a unique identifier that is associated with that TPM code. Other embodiments may index the keys somewhat differently, yet remain with the scope of the present invention.

Figure 7:
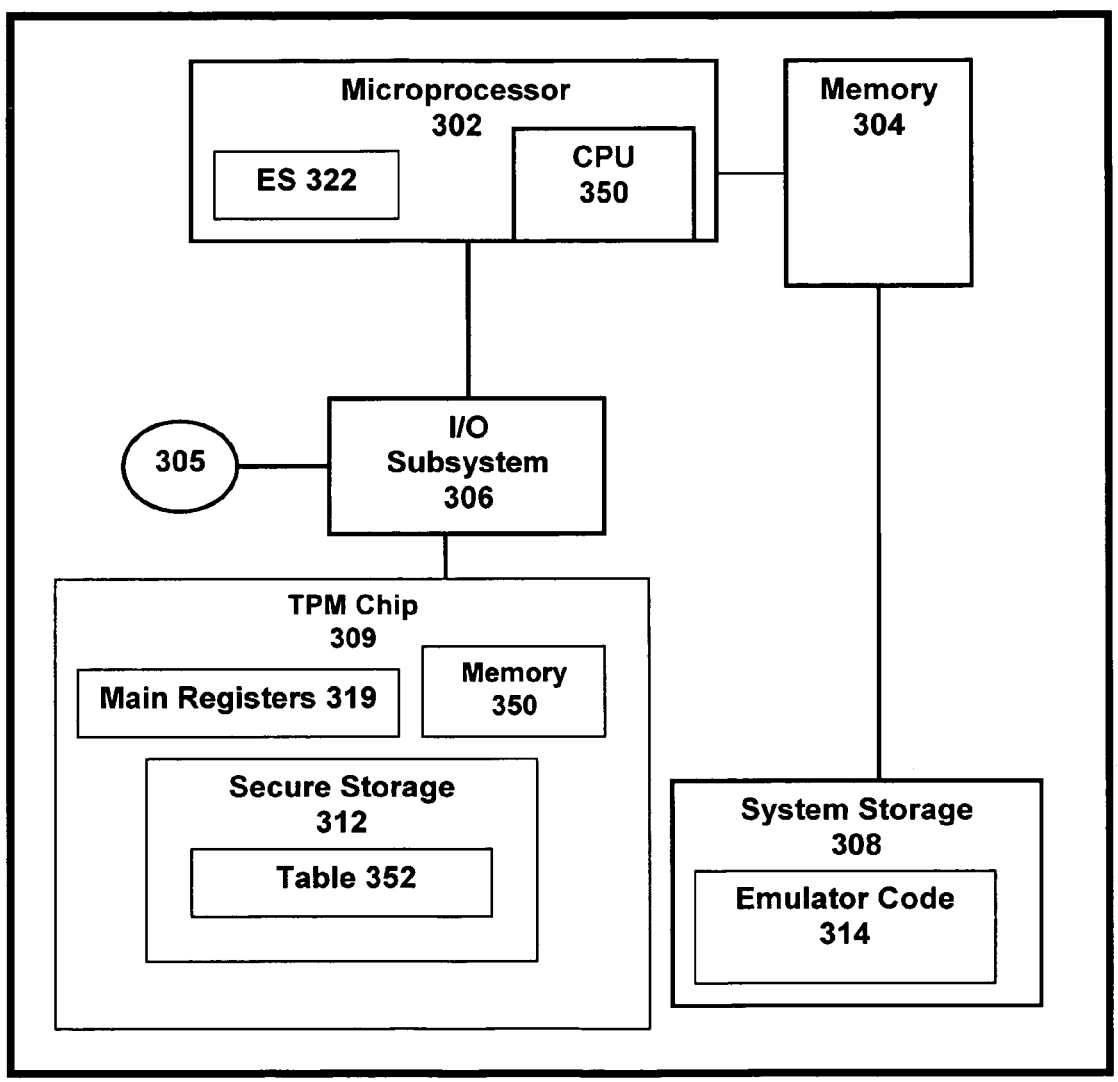
FIG. 7 is a simplified block diagram of an alternate configuration of the information processing system of FIG. 3, according to another embodiment of the present invention.

Referring now to FIG. 7 there is shown an alternate configuration for the information processing system 300 of FIG. 3. System 700 shows only one table 352 residing in secure storage 312 within the TPM chip 309. This table 352 is shown in FIG. 8. Note that unlike the table of FIG. 5, table 352 holds the validation public keys (PK), the hash algorithms, the hash values, and the endorsement keys.

Figure 9:
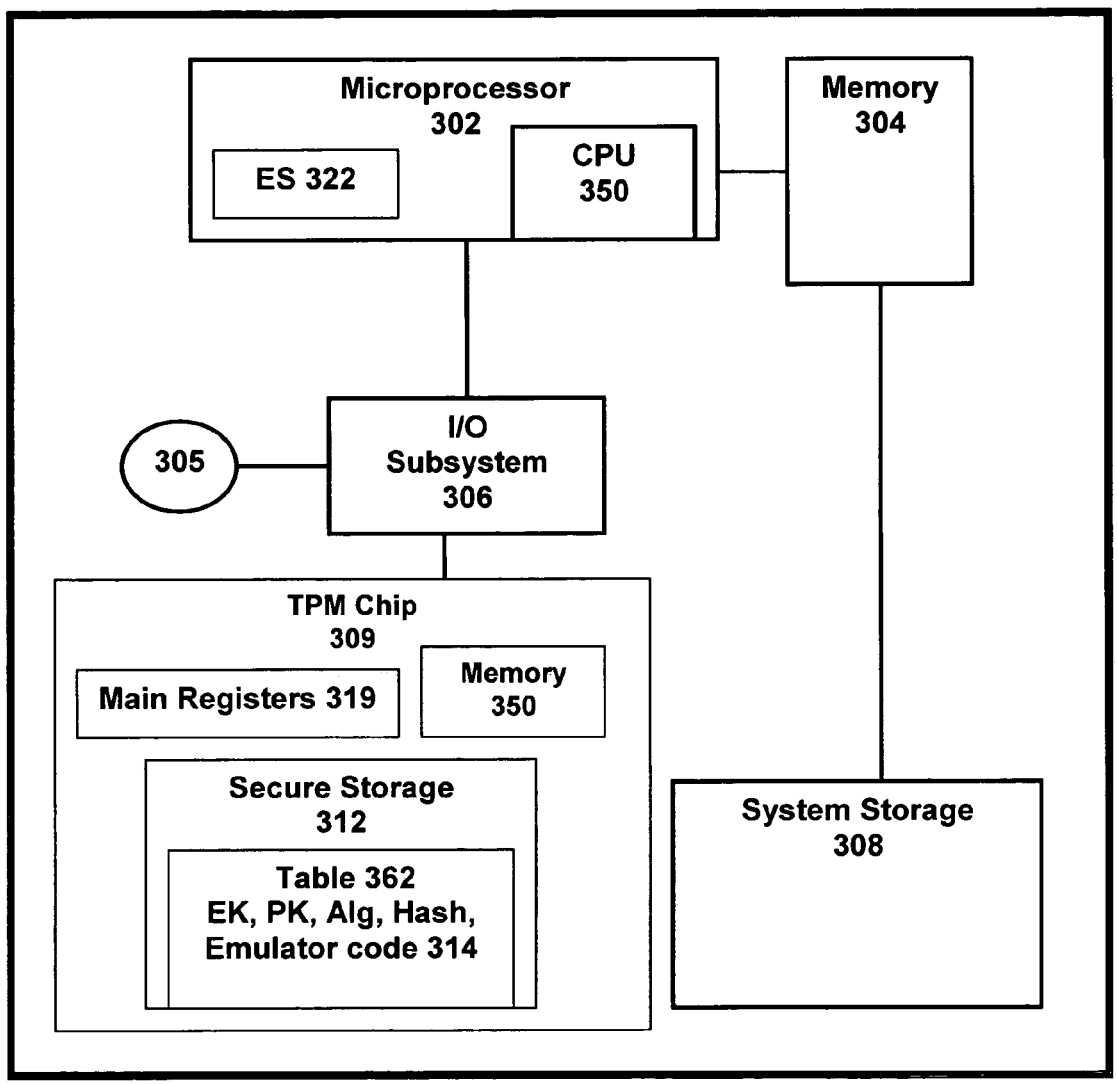
FIG. 9 is a simplified block diagram of another alternate configuration of the information processing system of FIG. 3, according to another embodiment of the present invention.

Another configuration within the scope of the present invention is shown in the block diagram of FIG. 9. Information processing system 900 again shows only one table 362 residing in secure storage 312. However, this table 362, unlike table 352 of FIG. 7, holds the TPM Codes, as well as the endorsement keys, the validation public keys, and the hash information. This table 362 is shown in FIG. 10. Note the emulator code 314 is system firmware. Other configurations of tables and keys are possible within the spirit and scope of the present invention.

The Process.

The code validation method, according to an embodiment of the present invention, validates TPM emulator code without exposing its own internal code. This is because the authentication is done prior to loading the emulator code into the microcontroller execution space 322 through the use of tables and their indexed values. Hardware-resident security measures are considered to be the most reliable, therefore it is preferable to hard-wire as much information as possible into the microprocessor and/or the chipset. Space becomes an issue; therefore a determination must be made as to what information gets hard-wired and what can be stored elsewhere. The flexibility of this code validation method allows the TPM emulator code 314 to be stored either within the microprocessor 302 or outside of the microprocessor 302. In this example of FIG. 3 the code 314 is stored in system storage 308 outside of the microprocessor 302. The authentication method described here below will assure the validity of the code before it is executed, even though it has been stored outside of a shielded location. The authentication method is able to easily identify code that has been tampered with.

Figure 4:
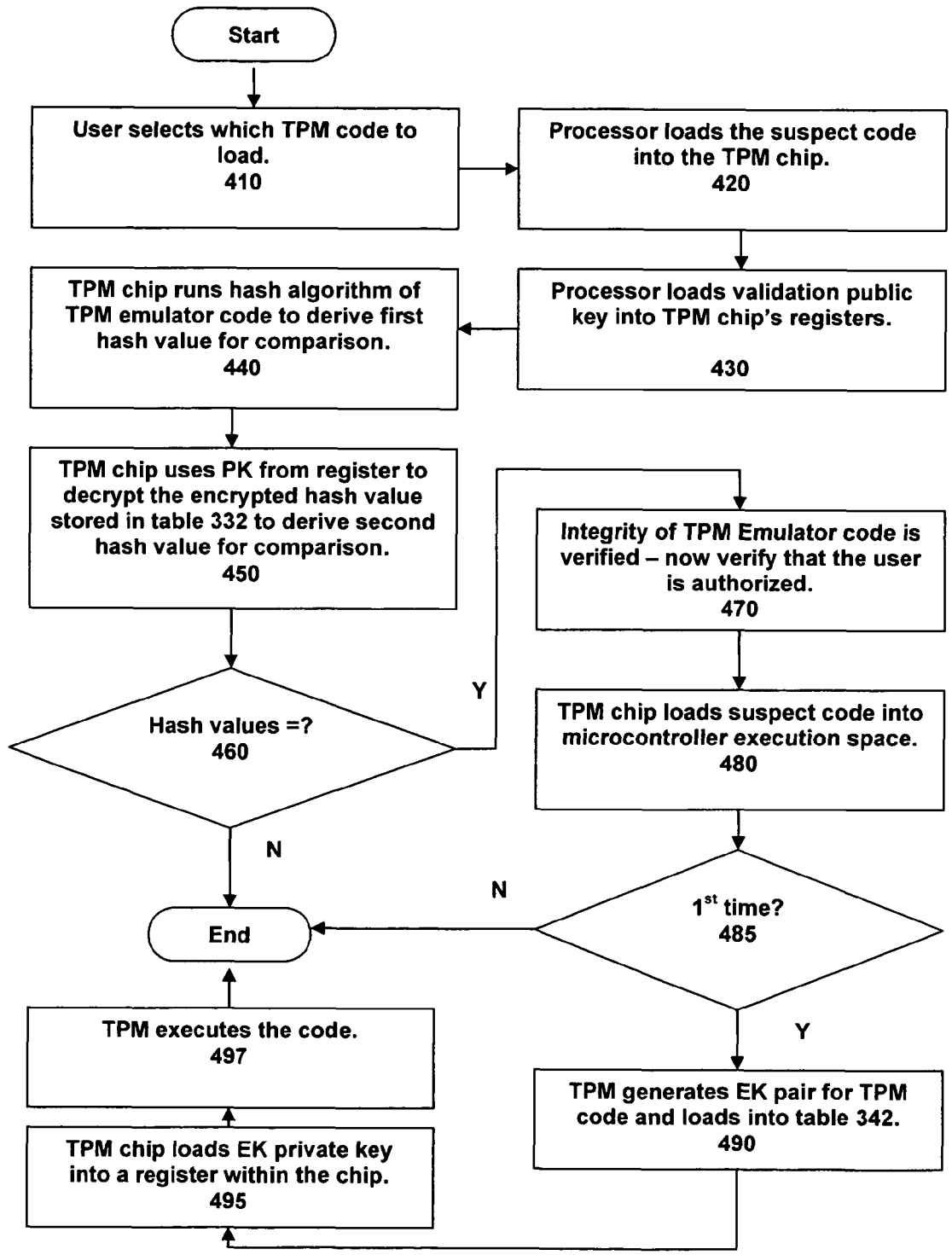
FIG. 4 is a flowchart of a method according to an embodiment of the invention.

Referring to FIG. 4 there is shown a flowchart 400 of the code validation method according to an embodiment of the present invention. The process begins at step 410 when a user selects a TPM code to execute from the pre-loaded set of emulator code 314 in system storage 308. The user interacts with the system 300 through the input/output subsystem 306. The user selects a TPM code from the various TPM codes available. These codes are generally stored in system storage, not in the TPM chip 309. The TPM code that the user selects is code that the user wants to run as a TPM emulator (referred to hereafter as "suspect code"). The user wishes to load this suspect code so that it can be executed. For it to be executed, it has to be loaded into the execution space 322. When executed from the execution space 322, this emulator code will simulate whatever TPM the user has selected.

Assuming that the user has selected TPM code for $TPM_4$, the processor 302 must confirm the system identity of this suspect code, TPM Code4. This means that $TPM_4$ must be a "trusted" TPM and TPM Code4 must have remained unchanged since it was loaded into the system 300. In order to do this, the microprocessor 302 loads the suspect code into the TPM chip 309 in step 420 and in step 430 loads the validation public key used to sign TPM Code4 into the chip's main registers 319. This validation public key is PK4 from table 332, shown in FIG. 5. TPM Code4 is loaded into memory 350 inside the TPM 309. Note that although the suspect code is loaded into the TPM 309, it has not been brought into the execution space 322 because it has not been verified.

Next, in step 440, the TPM chip 309 uses the suspect code, TPM Code4, as an index to retrieve its corresponding hash algorithm, Alg4, from table 332. The chip 309 runs Alg4 in order to compute a first hash value. Keep in mind that each instance of TPM code is associated with its own hash algorithm and keys needed to decrypt the algorithms are freely accessible in system storage 308. Next, in step 450, using the validation public key, PK4, associated with TPM Code4, the TPM chip 309 decrypts the hash value, Hash4, that pertains to Alg4 (from table 332). This provides a second hash value. These two hash values, the first hash value computed in step 440 and the second hash value decrypted in step 450, should be identical. If they are identical, this confirms that TPM Code4 is unchanged and it has not been tampered with or modified in any way since it was loaded onto the system 300. This verification step is what enables the different emulator codes 314 to be kept outside of the relative security of the chip 309.

In step 460, the first and second hash values are compared by the chip 309. If the values match (the comparison code returns a TRUE result) this indicates that TPM Code4 has been verified and it is assumed unchanged and trusted.

Next, in step 470 an optional step of verifying that the user is authorized to run TPM code4 is carried out. After verification, in step 480 the suspect code is loaded into the microcontroller execution space 322 so that it can be executed.

In step 485 a check is made to determine if this is the first time that TPM Code4 has been run. If so, then in step 490 the TPM chip 309 will generate an EK pair for this code, EK4. Each TPM generates its own EK comprising one private key portion (EKpr) and one public key portion (EKpu) at its initiation. This key pair is stored in table 342, according to an embodiment of the invention.

Referring now to FIG. 6, table 342 holds the EK, indexed by the TPM code, for each instance of TPM code loaded into the system 300. The EKpu from EK4 can be given to other individuals so that they may verify that a document was signed by the private key EKpr. The EKpr will not be given out.

In step 495, at the time that TPM Code4 is loaded into the execution space 322, the private key associated with it, EKpr4, is loaded from table 342 into the TPM's main registers 319. The registers 319 store only the currently needed keys. Once a new TPM emulator is loaded into the registers, the keys are replaced. This is done so that a user has the ability to generate a proprietary private/public key pair for security reasons. It is important to note that a user may not know the hash algorithm used to generate the key pair; therefore the user will need this key pair to be able to sign and validate the user's loaded code. There is a process to migrate/back up the private keys. This process involves encrypting the private key during the export process and is known to those with knowledge in the art. Lastly, in step 497, the TPM executes the code, TPM Code4, from the execution space 322 after the EK4 keys are loaded and stored.

If the values from the hash value comparison of step 460 do not match, the emulator code 314 is not moved into the execution space 322, therefore it cannot be run, and the process ends. Any code currently residing in the execution space 322 has not been exposed to any security breach throughout this entire operation. By securing the validation public keys (PKs) and hash values only in secure storage 322, this method reduces the amount of space required, while still providing security. The PKs and hash algorithms can be offloaded to a less secure storage location in order to conserve space. This is particularly important because of the physical space constraints imposed by the increasing number of keys which need to be considered.

Therefore, while there have been described what are presently considered to be the preferred embodiments, it will be understood by those skilled in the art that other modifications can be made within the spirit of the invention.

We claim:

1. A system for validation of code, the system comprising:
an input/output subsystem receiving a user selection of trusted platform module (TPM) emulator code from among a plurality of TPM emulator codes stored in system storage;
a processor comprising an execution space;
a system memory operably coupled with the processor;
the system storage comprising the plurality of the TPM emulator code enabling the processor to simulate any trusted platform module (TPM);
a trusted platform module (TPM) device to emulate different trusted platform modules using the emulator code, said TPM device comprising:
secure memory comprising embedded instructions;
trusted platform module registers;
a secure storage area comprising a first lookup table storing a hash table comprising encrypted hash values and validation public keys for each instance of trusted platform modules and a plurality of hash algorithms associated with the validation public keys and the encrypted hash values;
wherein said validation public keys and encrypted hash values are indexed by the TPM emulator code and validation software, wherein each encrypted hash value is bound with an endorsement key for its associated TPM code;
a second table holding an endorsement key pair for each instance of trusted platform modules, said endorsement key pair each comprising an endorsement private key and an endorsement public key;
wherein the TPM device is configured to perform:
loading the user-selected TPM emulator code into the TPM device;
using the user-selected TPM emulator code as an index to retrieve its corresponding hash algorithm from the lookup table;
running a hash algorithm selected from the plurality of hash algorithms to compute a first hash value;
decrypting the first hash value pertaining to the hash algorithm to provide a second hash value, using a validation public key associated with the user-selected TPM emulator code;
comparing the first and second hash values;
moving the user-selected TPM emulator code into the execution space only when it is determined that the first and second hash values match; and
loading the private key associated with the user-selected TPM emulator code into the trusted platform module registers.

2. The system of claim 1 wherein the second table further comprises:
trusted platform module emulator code and an endorsement key associated with an emulator code encryption algorithm.

3. The system of claim 1 wherein the hash algorithms are stored in unencrypted system storage.

4. The system of claim 1 wherein the endorsement private keys are stored in the trusted platform module registers.

5. The system of claim 1 wherein the at least one table in the secure storage area comprises validation firmware.

6. The system of claim 1 further comprising:
system storage located outside of the processor and the trusted platform module device, said system storage comprising at least one table for storing validation software.

* * * * *